US011388721B1

(12) United States Patent
Marupaduga et al.

(10) Patent No.: US 11,388,721 B1
(45) Date of Patent: Jul. 12, 2022

(54) USE OF VOICE MUTING AS A BASIS TO LIMIT APPLICATION OF RESOURCE-INTENSIVE SERVICE

(71) Applicant: Sprint Spectrum L.P., Overland Park, KS (US)

(72) Inventors: Sreekar Marupaduga, Overland Park, KS (US); Vanil Parihar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 57 days.

(21) Appl. No.: 16/895,354

(22) Filed: Jun. 8, 2020

(51) Int. Cl.

| | |
|---|---|
| ***H04W 56/00*** | (2009.01) |
| ***H04W 72/04*** | (2009.01) |
| ***H04W 28/18*** | (2009.01) |
| ***H04L 45/28*** | (2022.01) |
| ***H04W 4/16*** | (2009.01) |

(52) U.S. Cl.

CPC ........... *H04W 72/048* (2013.01); *H04L 45/28* (2013.01); *H04W 4/16* (2013.01); *H04W 28/18* (2013.01); *H04W 72/042* (2013.01)

(58) Field of Classification Search

CPC ..... H04W 72/048; H04W 4/16; H04W 28/18; H04W 72/042; H04L 45/28

USPC .......................................................... 370/329

See application file for complete search history.

(56) References Cited

U.S. PATENT DOCUMENTS

| | | | | |
|---|---|---|---|---|
| 10,172,029 | B1 * | 1/2019 | Oroskar | H04L 1/08 |
| 2005/0154584 | A1 * | 7/2005 | Jelinek | G10L 19/00 704/219 |
| 2006/0218127 | A1 * | 9/2006 | Tate | G06Q 10/0631 |
| 2016/0029349 | A1 * | 1/2016 | Vargantwar | H04W 74/006 370/329 |
| 2016/0277952 | A1 * | 9/2016 | Hui | H04W 24/08 |
| 2017/0353598 | A1 * | 12/2017 | Cho | H04M 3/2227 |
| 2018/0102831 | A1 * | 4/2018 | Murphy | H04W 64/00 |

FOREIGN PATENT DOCUMENTS

| | | |
|---|---|---|
| WO | WO 2017/097349 | 6/2017 |

* cited by examiner

*Primary Examiner* — Sai Ming Chan

(57) ABSTRACT

A method and system for controlling air-interface resource utilization in a wireless communication system in which an access node provides service on a carrier defining air-interface resources. An example method includes monitoring a rate of voice muting on the carrier, detecting when the monitored rate of voice muting on the carrier is at least predefined threshold high, and responsive to detecting that the monitored rate of voice muting on the carrier is at least predefined threshold high, starting to apply a maximum limit on how many user equipment devices (UEs) the access node will concurrently serve with a resource-intensive service on the carrier.

20 Claims, 4 Drawing Sheets

USE OF VOICE MUTING AS A BASIS TO LIMIT APPLICATION OF RESOURCE-INTENSIVE SERVICE

BACKGROUND

A cellular wireless network typically includes a number of access nodes that are configured to provide wireless coverage areas, such as cells and cell sectors, in which user equipment devices (UEs) such as cell phones, tablet computers, machine-type-communication devices, tracking devices, embedded wireless modules, and/or other wirelessly equipped communication devices (whether or not user operated), can operate. Each access node could be coupled with a core network that provides connectivity with various application servers and/or transport networks, such as the public switched telephone network (PSTN) and/or the Internet for instance. With this arrangement, a UE within coverage of the cellular network could engage in air-interface communication with an access node and could thereby communicate via the access node with various application servers and other entities.

Such a network could operate in accordance with a particular radio access technology (RAT), with communications from the access nodes to UEs defining a downlink or forward link and communications from the UEs to the access nodes defining an uplink or reverse link.

Over the years, the industry has developed various generations of RATs, in a continuous effort to increase available data rate and quality of service for end users. These generations have ranged from "1G," which used simple analog frequency modulation to facilitate basic voice-call service, to "4G"—such as Long Term Evolution (LTE), which can facilitate mobile broadband service using technologies such as orthogonal frequency division multiplexing (OFDM) and multiple input multiple output (MIMO). And most recently, the industry is now exploring developments in "5G" and particularly "5G NR" (5G New Radio), which may use a scalable OFDM air interface, advanced channel coding, massive MIMO, beamforming, and/or other features, to support higher data rates and countless applications, such as mission-critical services, enhanced mobile broadband, and massive Internet of Things (IoT).

In accordance with the RAT, each access node could provide coverage on one or more radio frequency (RF) carriers, each of which could be frequency division duplex (FDD), defining separate frequency channels for downlink and uplink communication, or time division duplex (TDD), with a single frequency channel multiplexed over time between downlink and uplink use. Each such frequency channel could be defined as a specific range of frequency having a bandwidth and a center frequency and thus extending from a low-end frequency to a high-end frequency.

Further, on the downlink and uplink, the air interface on each carrier could be configured in a specific manner to define physical resources for carrying information (e.g., user-plane data and control-plane signaling) wirelessly between the access node and UEs.

In a non-limiting example implementation, for instance, the air interface on each carrier could be divided over time into frames, transmission time intervals (TTIs) (e.g., subframes), and symbol time segments, and over frequency into subcarriers that could be modulated to carry data. The example air interface could thus define an array of time-frequency resource elements, with each resource element spanning a respective symbol time segment and occupying a respective subcarrier, and the subcarrier of each resource element could be modulated to carry information. Further, each TTI may be defined by subframes. In each TTI, the resource elements on the downlink and uplink of the example air interface could be grouped to define physical resource blocks (PRBs) that could be allocated as needed to carry data between the access node and served UEs.

In addition, certain resource elements on the example air interface could be designated for special use. For instance, on the downlink, certain resource elements could be set aside to define a downlink control region for carrying control signaling from the access node to UEs, certain resource elements could be designated to carry broadcast synchronization signals that UEs could detect as an indication of coverage on the carrier and to establish frame timing, and certain resource elements could be designated to carry a reference signal that UEs could measure to determine coverage strength, among other possibilities. And on the uplink, certain resource elements could be set aside to define an uplink control region for carrying control signaling from UEs to the access node, and certain resource elements could be designated to carry uplink reference signals or the like that could be used to evaluate uplink signal communications, among other possibilities.

Overview

When a UE enters into coverage of an example network, the UE could detect threshold strong coverage of an access node on a particular carrier (e.g., a threshold strong reference signal broadcast by the access node on that carrier) and could then engage in random-access and connection signaling, such as Radio Resource Control (RRC) signaling, with the access node to establish an RRC connection or the like through which the access node will then serve the UE on the carrier. Further, if the UE is not already registered for service with the core network, the UE could transmit to the access node an attach request, which the access node could forward to a core-network controller for processing. And the core-network controller could then coordinate setup for the UE of one or more bearers extending between the UE and a core-network gateway that provides transport-network connectivity.

Once the UE is so connected and registered with the example network, the access node could then serve the UE in a connected mode on the carrier, managing downlink air-interface communication of packet data to the UE and uplink air-interface communication of packet data from the UE.

For instance, with the air interface described above, when packet data for the UE arrives at the core network from a transport network, the data could flow to the access node, and the access node could buffer the data, pending transmission of the data to the UE. The access node could then schedule and allocate downlink PRBs in an upcoming TTI for carrying at least a portion of the data, defining a transport block, to the UE. And the access node could then transmit to the UE in the downlink control channel of that subframe a Downlink Control Information (DCI) message that designates the allocated PRBs, and the access node could accordingly transmit the transport block to the UE in those designated PRBs.

For each such downlink transmission, the UE could then determine if the UE received the transport block successfully. For instance, the transmission could carry a cyclic redundancy check (CRC) value computed based on the transport block, and the UE could compute a CRC based on the received transport block and determine whether its computed CRC matches that carried by the transmission. If the UE receives the transmission and determines that the CRC matches or otherwise that the UE received the transport block successfully, then the UE could transmit to the access node a positive acknowledgement (ACK) control message, and the access node could then proceed with transmission of a next transport block (if any) to the UE. Whereas, if the UE did not receive the transmission or determined that the CRC did not match and thus that there was an error in the received transport block, then the UE could transmit to the access node a negative acknowledgement (NACK), in response to which the access node could attempt the transmission again.

Likewise, when the UE has data to transmit on the transport network, the UE could buffer the data, pending transmission of the data to the access node, and the UE could transmit to the access node a scheduling request that carries a buffer status report (BSR) indicating the quantity of data that the UE has buffered for transmission. The access node could then allocate uplink PRBs in an upcoming TTI to carry a transport block of the data from the UE and could transmit to the UE, in the downlink channel of a preceding subframe, a DCI message that designates those upcoming PRBs. And the UE could then accordingly transmit the transport block to the access node in the designated PRBs.

As with downlink transmission, for each transport block that the UE transmits to the access node, the access node could determine if the transport block arrived successfully, based on a CRC analysis. And if the access node received the transmission successfully, then the access node could transmit to the UE an ACK and could schedule a next uplink transmission from the UE. Whereas, if the access node did not receive the transmission successfully, then the access node could transmit to the UE a NACK, and the UE could attempt re-transmission to the access node.

Normally, the UE may transmit data in one subframe corresponding to a TTI, and then wait to receive a NACK or ACK response before re-transmitting the data or transmitting additional data. This re-transmission process may give rise to a delay as the UE waits for the response. In order to reduce the delay associated with re-transmitting data, a representative RAT could support a bundling option for data transmissions. A possible bundling option for data transmissions could be to repeatedly transmit data in multiple consecutive TTIs, referred to as TTI bundling. When TTI bundling is used, the UE automatically transmits the data repeatedly in multiple consecutive TTIs and then waits to receive a NACK or ACK response for that group of transmissions. In this way, the UE can transmit multiple instances of the data, which allows for more robust reception of the data, but without the delay that would be associated with the UE transmitting the data multiple times and waiting for a NACK or ACK response after each transmission.

As an access node serves a UE on a given carrier, the bandwidth of the carrier may also define an effective limit on the peak rate of data communication between the access node and the UE, as the bandwidth would define only a limited number of air-interface resources (e.g., PRBs) per TTI that could be allocated for use to carry data communications. Further, the data rate available on the carrier could also be limited by the access node serving multiple UEs at once on the carrier, with the access node allocating PRBs per TTI among the various served UEs.

One way to help overcome this per-carrier data rate limitation is to have an access node serve a UE on multiple carriers at once, providing the UE with "carrier-aggregation" service. With carrier-aggregation service, multiple carriers from either contiguous frequency bands or non-contiguous frequency bands are aggregated together as "component carriers" to increase the overall bandwidth available per subframe by providing more air-interface resources on which the access node can schedule uplink and downlink communication. In a representative carrier-aggregation implementation, one of the UE's serving carriers is deemed a primary component carrier or primary cell (PCell), while each other of the UE's serving carriers is deemed a secondary component carrier or secondary cell (SCell).

In practice, the UE's PCell could function as the anchor for carrying key control signaling between the UE and the access node, such as scheduling requests and DCI messaging for instance. Further, the UE's PCell might be used for both downlink and uplink service of the UE, while each SCell in the UE's connection might be used for just downlink service of the UE, to help increase the UE's peak downlink data rate.

With the above arrangement, a UE might engage in various forms of communication, an example of which for present purposes is voice over packet (VOP) call communication. VOP-call communication involves communication of voice-call audio in a sequence of Internet Protocol (IP) packets. For an end-to-end VOP call, for instance, a device at one end of a VOP call could receive a user's voice audio (e.g., speech or other voice-band audio), digitize the voice audio using a voice codec to produce a digital bit stream, encode the bit stream to compress it for transmission, packetize the encoded bit stream into a sequence of voice packets, and transmit the voice packets to another device. And on receipt, the other device could then de-packetize the encoded bit stream, decode the bit stream, and convert the bit stream to analog audio output using a voice codec for playout to another user. Further, typical VOP systems provide silence voice packets as filler or natural background noise at times during the call when there is no talking.

In a representative wireless communication system, the voice codec outputs a new voice frame approximately every 20 milliseconds. Given the rate of output, the voice frames should be transmitted from one device to another device in a timely manner in order to prevent problems on receipt such as receiving the voice frames out of order. However, a heavy load on the carrier may pose an issue for voice packet transmission.

In some instances, due to a heavy load of data being transmitted on the carrier, voice packet transmission may fail. Packets that are not successfully transmitted to their destination are referred to as dropped packets. Packets may be dropped as the result of congestion on the carrier, e.g., if there is low PRB availability. For example, an access node may have insufficient air-interface resources available to carry the packet in a timely manner. When there are insufficient air-interface resources on a carrier, the voice packets may be buffered for too long awaiting available PRBs and may therefore be dropped, e.g. per a packet-drop timer. Thus voice packets may not be transmitted. Other examples may exist as well.

Dropped voice packets could result in the loss of voice communication due to the failure to transmit digitized audio on the uplink and/or the downlink. This loss of communication is known as voice muting. When voice muting occurs, a user may not receive a portion of audio sent as a voice packet. Thus, voice muting may negatively affect user-experience.

The present disclosure provides a mechanism that could help address the problem of voice muting. The mechanism could detect a high rate of muting on an uplink and/or a downlink of a carrier in a system in which an access node operates on the carrier. In response to detecting that at least a threshold high rate of voice muting is occurring, the access node could take action to limit PRB utilization on the carrier, so as to help reduce the rate of voice muting. For example, the access node could responsively limit an extent to which the access node provides a resource-intensive service on or with the carrier, such as by imposing a maximum limit on the number of UEs that the access node would serve concurrently with the resource-intensive service on the carrier.

Without limitation, for instance, resource-intensive services may include providing TTI bundling on the carrier and/or using the carrier as an SCell for carrier-aggregation service. Because these services take up a large amount of available resources for data transmission, they may contribute to the high rate of voice muting on a carrier. Thus, limiting the use of these services when faced with a high rate of voice muting may help to lower the rate of voice muting.

These as well as other aspects, advantages and alternatives will become apparent to those reading the following description, with reference where appropriate to the accompanying drawings. Further, it should be understood that the discussion in this overview and elsewhere in this document is provided by way of example only and that numerous variations are possible.

DETAILED DESCRIPTION

An example implementation will now be described in the context of a cell site that supports 4G LTE and/or 5G NR service, possibly together with one or more other RATs. However, it should be understood that the principles disclosed herein could extend to apply with respect to other scenarios as well. Further, it should be understood that other variations from the specific arrangements and processes described are possible. For instance, various described entities, connections, functions, and other elements could be added, omitted, distributed, re-located, re-ordered, combined, or changed in other ways. In addition, it should be understood that operations described as being performed by one or more entities could be implemented in various ways, such as by a processor executing instructions stored in non-transitory data storage, along with associated circuitry or other hardware, among other possibilities.

Figure 1:
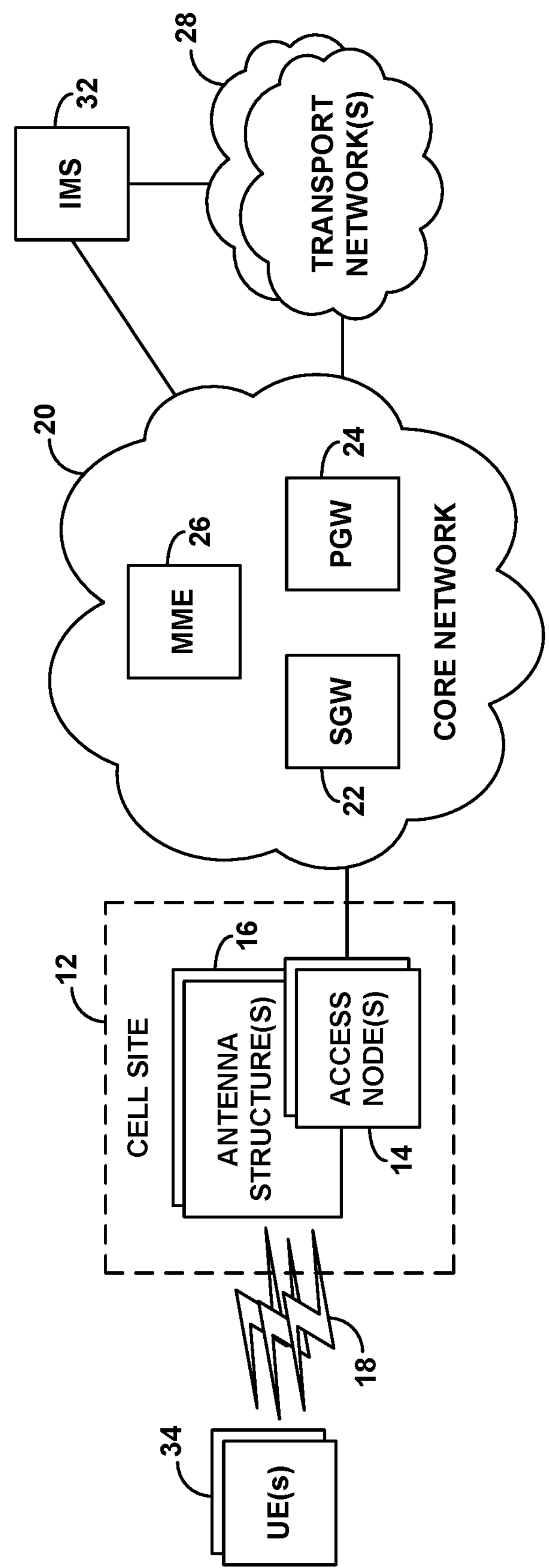
FIG. 1 is a simplified block diagram of an example communication system in which aspects of the present disclosure can be implemented.

FIG. 1 depicts an example cell site 12 that includes one or more access nodes 14 with one or more antenna structures 16, configured to provide coverage and service on one or more carriers 18. In the example implementation, without limitation, at least one of the access nodes 14 is a 4G LTE access node (e.g., evolved Node-B (4G eNB)) or a 5G NR access node (e.g., next generation Node-B (5G gNB)) configured to provide service on multiple carriers each structured as described above. Further, the cell site 12 could include one or more additional access nodes configured to provide service according to one or more other RATs, such as any of those noted above, among other possibilities.

These access nodes could be macro access nodes of the type configured to provide a wide range of coverage or could take other forms, such as small cell access nodes, repeaters, femtocell access nodes, or the like, possibly configured to provide a smaller range of coverage. Further, the access nodes could have respective antenna structures, which could be collocated with each other and configured to provide coverage of the same or similar direction and scope as each other.

As further shown in FIG. 1, the cell site 12 could interface with at least one core network 20 that provides connectivity with one or more transport networks and/or application servers. As illustrated, for instance, the core network 20 could include a serving gateway (SGW) 22, a packet data network gateway (PGW) 24, and a mobility management entity (MME) 26. With this arrangement, a representative access node could interface with the SGW 22, the SGW 22 could interface with the PGW 24, and the PGW 24 could interface with a transport network 28, so that user-plane communications could flow between a UE and the transport network over a communication path including the access node, the SGW, and the PGW. Further, the access node could interface with the MME 26, and the MME 26 could interface with the SGW 22, so that the MME 26 could engage in control-plane signaling with the access node and SGW 22 to coordinate setup of user-plane bearers and carrying out other operations.

As further illustrated, the core network 20 and/or transport network 28 could provide connectivity with an Internet Multimedia Subsystem (IMS) 32, which functions to support packet-based real-time media services such as VOP call service for instance. In an example implementation, the IMS 32 could include one or more signaling servers configured to engage in signaling to set up VOP call sessions for served UEs, and the IMS could include one or more media servers to bridge and carry voice call communications for served UEs.

Shown within coverage of cell site 12 are then a number of UEs 34, which could be any of the types discussed above, among other possibilities. At least a representative one of these UEs could be configured to support 4G LTE and/or 5G NR operation and to support VOP communication.

When the representative UE 34 enters into coverage of the example cell site, the UE could initially scan for and detect threshold strong coverage of an access node on a given carrier, and the UE could then connect with the access node on that carrier. As discussed above, for instance, the UE could engage in random-access signaling and RRC signaling with the access node to establish an RRC connection over which the access node will serve the UE. And the access node could establish in data storage a context record for the UE, identifying the RRC connection and indicating the carrier on which the access node is serving the UE.

In addition, the UE could engage in an attachment process with the MME as noted above to register for service and to trigger setup of one or more user-plane bearers for carrying UE communications between the UE and the PGW. For instance, the UE could transmit an attach request via the access node to the MME. And after authenticating the UE, the MME could then coordinate setup for the UE of one or more user-plane bearers, each including a data-radio bearer (DRB) portion extending over the air between the UE and the access node and an access-network portion extending via the SGW between the access node and then PGW.

Upon initial UE attachment, the MME could coordinate setup for the UE of a default bearer for carrying general data communications. Further, based on UE capability data indicating that the UE supports VOP communication, the MME could also coordinate setup for the UE of an IMS-signaling bearer for carrying VOP call setup signaling (e.g., Session Initiation Protocol (SIP) signaling) between the UE and the IMS, to enable the UE to place and receive VOP calls. For representative VOP communication, a codec could digitize and encode voice and output voice frames of approximately 20 milliseconds as noted above.

Once the UE is connected and attached, the access node could then serve the UE on the carrier indicated in the UE context record as described above. Namely, as packet data arrives at the PGW for delivery to the UE, the data could flow over an appropriate bearer to the access node, the access node could then provide transmission of the data to the UE on one or more downlink PRBs of the carrier. And when the UE has packet data to transmit, the UE could transmit a scheduling request to the access node, the access node could direct the UE to transmit the data on one or more uplink PRBs of the carrier, and the UE could accordingly transmit the data on the indicated uplink PRB(s), and the access node could forward the data over an appropriate bearer to the PGW.

Further, once the UE is connected with and served by the access node, the UE may from time to time place or receive VOP calls. For each such call, for instance, the UE could engage in SIP signaling with the IMS 32 to set up the VOP call, which could result in setup of a real-time media session that the IMS would bridge with another call party. Further, the IMS could signal to the core network, and the MME could responsively coordinate setup for the UE of a VOP-call bearer for carrying the VOP call communication between the UE and the PGW.

With the VOP call and associated VOP-call bearer set up, the UE could then engage in the VOP call. Namely, as the IMS has voice packets to transmit to the UE, those packets could flow from the IMS to the core network and over the UE's VOP-call bearer to the access node, and the access node could schedule and provide transmission of those packets on downlink PRBs to the UE. And as the UE has voice packets to transmit to the IMS, the access node could schedule transmission of those packets on uplink PRBs to the access node, the UE could accordingly transmit the packets to the access node, and the packets could flow over the UE's VOP-call bearer through the core network and to the IMS.

In addition, the access node could be configured to support various resource-intensive services on the carrier. As noted above, examples of resource-intensive services could include TTI bundling on the carrier and/or using the carrier as an SCell for carrier-aggregation service.

As noted above, TTI bundling could involve a UE automatically repeatedly transmitting data in multiple consecutive TTIs instead of transmitting data one TTI at a time and awaiting receipt of an acknowledgement message before possibly retransmitting. As indicated above, TTI bundling could allow for more robust reception of the data, but without the delay that may result from the UE transmitting the data multiple times and waiting for an acknowledgement message after each transmission. However, because of the repeated transmissions, TTI bundling would likely consume more air-interface resources than service without TTI bundling.

As further noted above, carrier aggregation provides for a way to overcome limited air resources on a carrier by having an access node serve a UE on multiple carriers at once. In a representative carrier-aggregation implementation, the access node may add a carrier to the UE's connection as an SCell. An SCell may help provide the UE with increased peak data rate by increasing the aggregate frequency bandwidth on which the access node serves the UE. However, use of a carrier as an SCell for carrier-aggregation service would likely consume more air-interface resources of that carrier than if the carrier would be used just as a PCell for UEs that connect primarily on the carrier.

In practice, the access node could concurrently serve a number of UEs with various services and, as noted above, these UEs may engage in voice calls on the carrier. Over time, the access node may serve the UEs with varying amounts of air-interface communication on the carrier including large amounts of air-interface communication that could result in a high load on the carrier. High loads are likely to cause problems for transmitting voice packets during a VOP call on the carrier. For example, high load may contribute to or cause voice muting.

As indicated above, the present disclosure provides for detecting at least predefined threshold rate of voice muting on an access node's carrier, and the access node responsively imposing a maximum limit on a number of UEs that the access node will concurrently provide with a resource-intensive service on the carrier. By imposing the maximum limit on the number of UEs that the access node will concurrently provide with a resource-intensive service on the carrier, the access node could help to limit PRB utilization on the carrier and reduce the load on the carrier, which may in turn help to reduce the extent of voice muting on the carrier.

In an example implementation, the access node could monitor the rate of voice muting on the carrier by tracking the extent to which voice packets that were to be transmitted over the carrier were not successfully transmitted over the carrier. Further, the access node could conduct this analysis as to the downlink and/or the uplink and could conduct the analysis on average over a sliding window of time, among other possibilities.

By way of example, for each VOP call that the access node serves on the carrier, the access node could monitor the rate of voice muting as a ratio of a period of time in the VOP call when no voice packets were transmitted to a total period of time of the VOP call. Without limitation, for instance, considering that a representative voice codec outputs a new voice frame every 20 milliseconds, the access node could monitor the rate of voice muting as a ratio of the number of 20-millisecond time segments during the VOP call in which no voice packets were transmitted to the total number of 20-millisecond time segments during the VOP call. Further, the access node could average this ratio for multiple VOP calls, to establish a representative rate of voice muting on the carrier.

As another example, the access node could monitor the rate of voice muting on the carrier as a rate at which voice packets were dropped due to being buffered too long awaiting transmission. As to the downlink, for instance, the access node could track the extent to which voice packets that the access node had buffered for transmission on one or more VOP-call bearers were dropped due to being buffered longer too long awaiting transmission. And as to the uplink, the access node could receive and average reports from its served UEs of the extent to which voice packets that the UEs had buffered for transmission were dropped due to being buffered too long awaiting transmission, and the access node could track an aggregate rate of such voice-packet dropping, as a number of such packet drops per unit time.

Further, the access node could determine when the monitored rate of voice muting on the carrier becomes threshold high. Here, the access node could regularly compare the monitored rate of voice muting to a predefined threshold high rate of voice muting. The predefined threshold rate of voice muting could be 0.75% or any threshold rate of voice muting that is deemed by engineering design to be problematic, among other possibilities In an example implementation, when the access node detects at least a threshold high rate of voice muting on the carrier, the access node could respond by imposing a maximum limit on a number of UEs that the access node will concurrently provide with a resource-intensive service on the carrier. For example, the access node could respond by setting itself to impose a maximum limit on the number of UEs that the access node would serve concurrently with TTI bundling and/or the number of UEs that the access node would serve concurrently with the carrier as an SCell for carrier-aggregation service.

The maximum limit that the access node imposes in response to detecting the threshold high rate of voice muting could be a new maximum limit more stringent than an existing maximum limit or could be an initially imposed maximum limit. For instance, the access node may already be configured to impose a maximum limit on the number of UEs that the access node would serve concurrently with TTI bundling on the carrier or the number of UEs that the access node would serve with the carrier as an SCell for carrier-aggregation service, and the access node could respond to the high rate of voice muting on the carrier by lowering that maximum limit. Or the access node may not yet be configured with such a limit and may respond to the high rate of voice muting on the carrier by newly introducing such a limit.

Further, the access node could set the maximum limit to a level selected based on the determined extent of voice muting on the carrier. For instance, if the access node determines that the extent of voice muting on the carrier is substantially higher than a threshold high rate, then the access node could apply a relatively low maximum limit of how many UEs the access node would concurrently provide with a resource-intensive service on the carrier. Whereas, if the access node determines that the extent of voice muting on the carrier is just slightly higher than the threshold high rate, then the access node could apply a relatively high maximum limit on how many UEs the access node would concurrently provide with the resource-intensive service on the carrier. Other examples are possible as well.

In addition, the access node could iteratively carry out this process based on continued monitoring of the rate of voice muting on the carrier. For example, after the access node responsively starts imposing a maximum limit as noted above, if the access node then determines that the rate of voice muting on the carrier is still too high, the access node could then responsively further lower the maximum limit of the number of UEs that the access node would concurrently serve with a resource-intensive service on the carrier. And the access node could continue this process until the rate of voice muting drops to an acceptable level.

Further, the access node's imposition of the limit on application of the resource-intensive service could be temporary. For instance, the access node could limit the number of UEs the access node serves with a resource-intensive service for a predetermined period of time. And after the predetermined period of time, the access node could then automatically revert to a default state of operation.

In an example implementation, a computing system at the cell site and/or in the core network could carry out and/or coordinate this process. For instance, the process could be implemented or coordinated by a UE's serving access node, by an adjunct processing system at the cell site, by an element management system in the core network, by the MME, and/or by one or more other entities.

Figure 2:
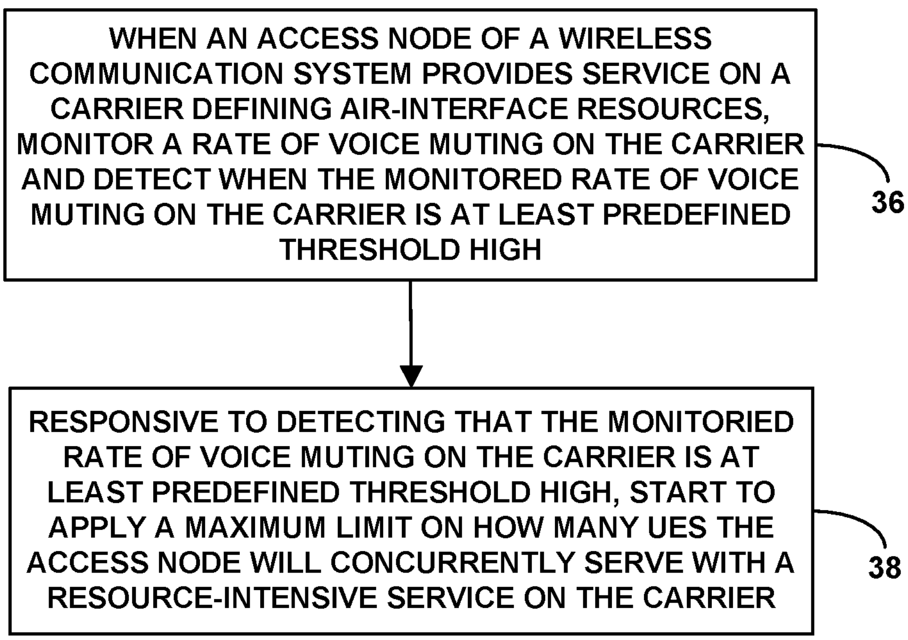
FIG. 2 is a flow chart depicting an example method in accordance with the disclosure.

FIG. 2 is a flow chart depicting a method that can be carried out in accordance with the present disclosure to control air-interface resource utilization in a wireless communication system in which an access node provides service on a carrier defining air-interface resources.

As shown in FIG. 2, at block 36, the method includes monitoring a rate of voice muting on the carrier and detecting when the monitored rate of voice muting on the carrier is at least predefined threshold high. And at block 38, the method includes, responsive to detecting that the monitored rate of voice muting on the carrier is at least predefined threshold high, starting to apply a maximum limit on how many UEs the access node will concurrently serve with a resource-intensive service on the carrier.

As discussed above, voice muting on the carrier could include failure of voice packet transmission on the carrier. Further, in line with the discussion above, monitoring the rate of voice muting on the carrier could be done as to the downlink and/or the uplink and could include determining a rate of voice-packet transmission failure per unit time. And determining the rate of voice-packet transmission failure per unit time could involve comparing a period of time where no voice packets were transmitted during a VOP call to a total period of time of the VOP call and could include averaging the rate across multiple VOP calls. Alternatively or additionally, determining the rate of voice-packet transmission failure per unit time could involve determining a rate of voice packets dropped per unit time due to being buffered too long awaiting transmission.

As further discussed above, the resource-intensive service on the carrier could take various forms, including without limitation (i) using the carrier as a secondary carrier for carrier-aggregation service and/or (ii) transmission-time-interval bundling service on the carrier.

In addition, as discussed above, the access node may normally operate in a first mode in which the access node is not set to apply the maximum limit. And in that case, the act of starting to apply the maximum limit could include transitioning from the first mode to a second mode in which the access node is set to apply the maximum limit. Further, the method could also include automatically reverting from the second mode back to the first mode after a predefined period of time.

Still further, as discussed above, the method could include determining the maximum limit on how many UEs the access node will concurrently serve with the resource-intensive service on the carrier, with the determining being based on the monitored rate of voice muting. And setting the maximum limit on how many UEs the access node will concurrently serve with the resource-intensive service on the carrier could involve setting as the maximum limit the determined maximum limit.

Figure 3:
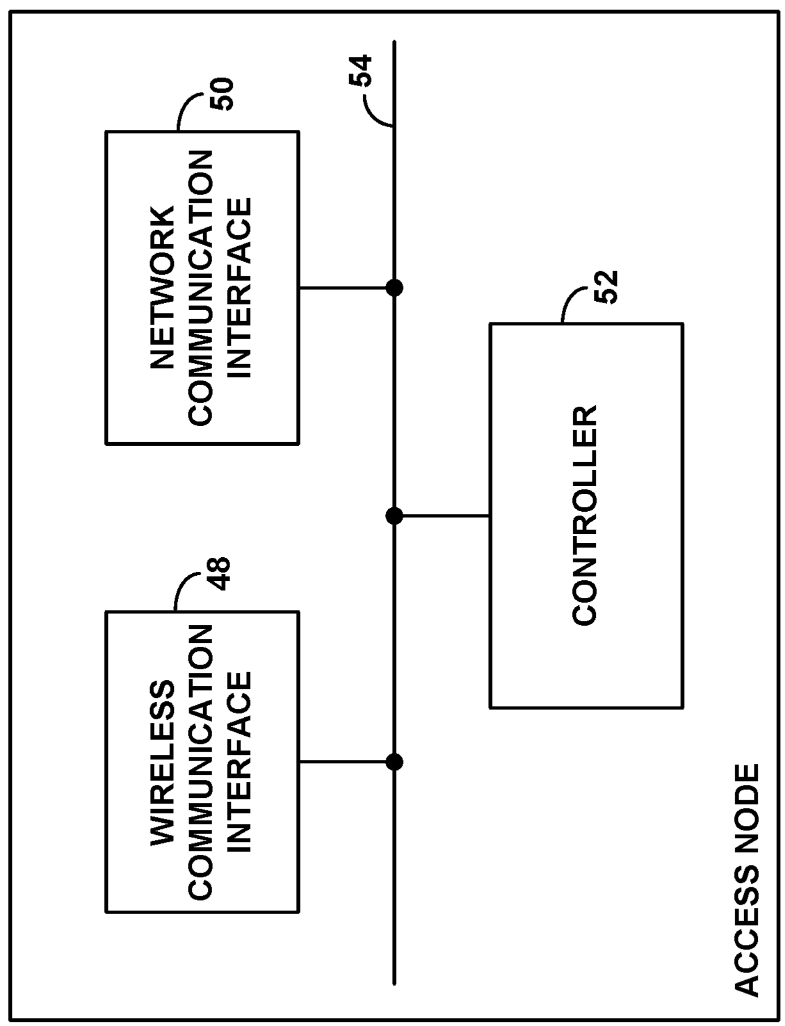
FIG. 3 is a simplified block diagram of an example access node operable in accordance with the disclosure.

FIG. 3 is next a simplified block diagram of an example access node that could operate in line with the method as discussed above. As shown in FIG. 3, the example access node includes a wireless communication interface 48, a network communication interface 50, and a controller 52, which could be integrated together or communicatively linked together by a system bus, network, or other connection mechanism 54.

In this example arrangement, the wireless communication interface 48 could be configured to provide cellular coverage and to engage in air-interface communication with served UEs. As such, wireless communication interface 48 could comprise an antenna structure, which could be tower mounted or could take other forms, and associated components such as power amplifiers and a wireless transceiver, to facilitate providing a coverage area on multiple carriers as shown in FIG. 1 and engaging in air-interface communication according to a RAT such as any of those noted above.

Further, the network communication interface 50 could be configured to provide communication on a core network. The network communication interface 50 could comprise a wired or wireless interface, such as an Ethernet network communication interface, configured to support communication with other entities, such as with various core-network entities and other access nodes for instance.

Controller 52 could then comprise control logic to cause the access node to carry out particular operations including those described herein. As such, the controller 52 could take various forms, including but not limited to a programmed processing unit. The programmed processing unit may include one or more processors (e.g., one or more general purpose microprocessors and/or one or more dedicated processing units) and non-transitory data storage (e.g., one or more volatile and/or non-volatile storage components, such as magnetic, optical, or flash storage) holding program instructions executable by the processing unit to cause the processing unit and thus the access node to carry out various operations described herein.

Various features described above can be implemented in this context, and vice versa. For instance, as noted above, the resource-intensive service on the carrier could include (i) using the carrier as a secondary carrier for carrier-aggregation service and/or (ii) transmission-time-interval bundling service on the carrier, among other possibilities. Further, the access node might normally operate in a first mode in which the access node is not set to apply a maximum limit on how many UEs the access node will concurrently serve with a resource-intensive service on the carrier, and the access node starting to apply the maximum limit may could then involve the access node transitioning from the first mode to a second mode for a predetermined period of time in which the access node is set to apply the maximum limit, and the access node then transitioning back to the first mode.

Figure 4:
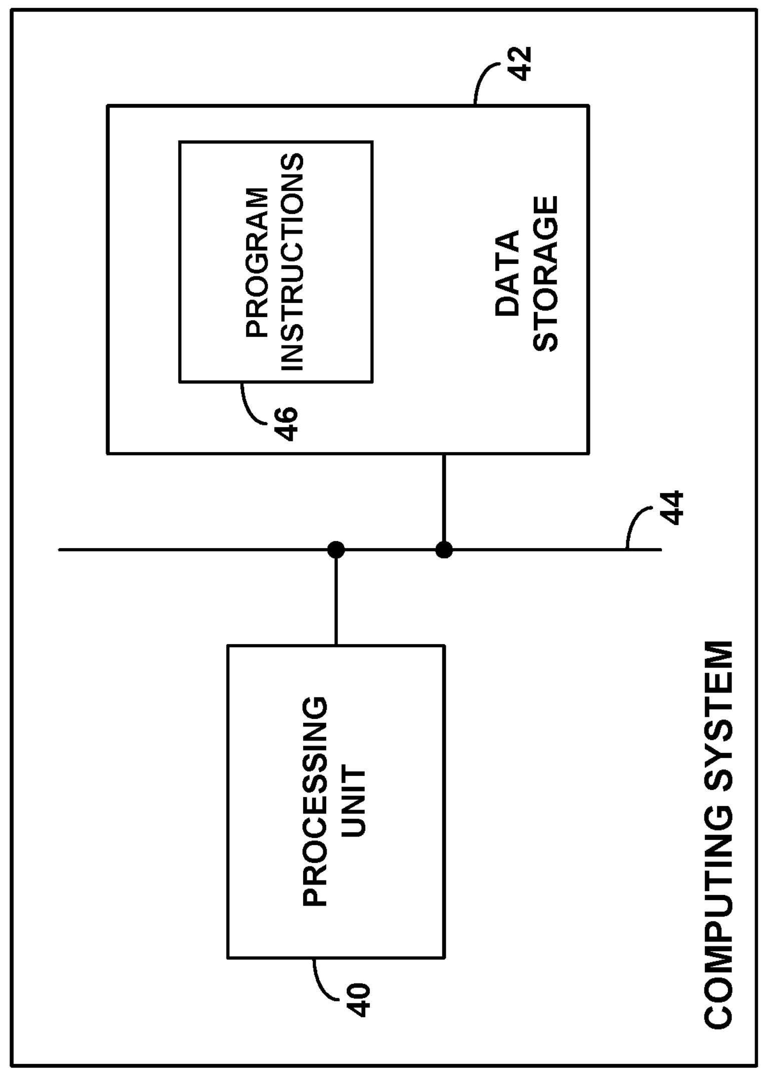
FIG. 4 is a simplified block diagram of an example computing system operable in accordance with the disclosure.

Finally, FIG. 4 is a block diagram of an example computing system that could be configured to carry out operations such as those discussed above, to control air-interface resource utilization and service provided by an access node. As noted above, this computing system could be implemented by various entities in the wireless communication system.

As shown in FIG. 4, the example computing system includes at least one processing unit 40 and at least one non-transitory data storage 42, which could be integrated together or interconnected by a system bus, network, or other connection mechanism 44. The processing unit 40 could comprise one or more general purpose processors (e.g., microprocessors) and/or one or more special purpose processors (e.g., application specific integrated circuits). And the data storage 42 could comprise one or more volatile and/or non-volatile storage components (e.g., magnetic, optical, or flash storage).

As further shown, the non-transitory data storage 42 could hold program instructions 46. These program instructions could be executable by the processing unit 40 to carry out operations such as those discussed above, among other possibilities.

For instance, as discussed above, these operations could include (i) monitoring a rate of voice muting on a carrier (ii) detecting when the monitored rate of voice muting on the carrier is at least predefined threshold high; and (iii) responsive to detecting that the monitored rate of voice muting on the carrier is at least predefined threshold high, starting to apply (e.g., causing the access node to start to apply) a maximum limit on how many UEs the access node will concurrently serve with a resource-intensive service on the carrier.

Various features described above can be implemented in this context as well, and vice versa.

It should also be understood that the present disclosure additionally contemplates a non-transitory computer readable medium that stores, has encoded thereon, or otherwise embodies program instructions executable to carry out such operations as well.

Exemplary embodiments have been described above. Those skilled in the art will understand, however, that changes and modifications may be made to these embodiments without departing from the true scope and spirit of the invention.

We claim:

1. A method for controlling air-interface resource utilization in a wireless communication system in which an access node provides service on a carrier defining air-interface resources, the method comprising:

monitoring a rate of voice muting on the carrier;

detecting when the monitored rate of voice muting on the carrier is at least predefined threshold high; and responsive to detecting that the monitored rate of voice muting on the carrier is at least predefined threshold high, starting to apply a maximum limit on how many user equipment devices (UEs) the access node will concurrently serve with a resource-intensive service on the carrier.

2. The method of claim 1, wherein voice muting on the carrier comprises failure of voice-packet transmission on the carrier.

3. The method of claim 1, wherein monitoring the rate of voice muting on the carrier comprises determining a rate of voice-packet transmission failure per unit time.

4. The method of claim 3, wherein determining the rate of voice-packet transmission failure per unit time comprises comparing a period of time where no voice packets were transmitted during a voice over packet (VOP) call to a total period of time of the VOP call.

5. The method of claim 4, wherein determining the rate of voice-packet transmission failure per unit time further comprises averaging the rate across multiple VOP calls.

6. The method of claim 3, wherein determining the rate of voice-packet transmission failure per unit time comprises determining a rate of voice packets dropped per unit time due to being buffered too long awaiting transmission.

7. The method of claim 1, wherein the carrier defines a downlink and an uplink, and wherein monitoring the rate of voice muting on the carrier is done as to the downlink.

8. The method of claim 1, wherein the carrier defines a downlink and an uplink, and wherein monitoring the rate of voice muting on the carrier is done as to the uplink.

9. The method of claim 1, wherein the resource-intensive service on the carrier is selected from the group consisting of (i) using the carrier as a secondary carrier for carrier-aggregation service and (ii) transmission-time-interval bundling service on the carrier.

10. The method of claim 1, wherein the access node normally operates in a first mode in which the access node is not set to apply the maximum limit, and wherein starting to apply the maximum limit comprises transitioning from the first mode to a second mode in which the access node is set to apply the maximum limit.

11. The method of claim 10, further comprising automatically reverting from the second mode back to the first mode after a predefined period of time.

12. The method of claim 1, wherein the method is carried out by the access node.

13. The method of claim 1, further comprising determining the maximum limit on how many UEs the access node will concurrently serve with the resource-intensive service on the carrier, wherein determining the maximum limit is based on the monitored rate of voice muting, wherein setting the maximum limit on how many UEs the access node will concurrently serve with the resource-intensive service on the carrier comprises setting as the maximum limit the determined maximum limit.

14. An access node configured to control air-interface resource utilization on a carrier defining air-interface resources, the access node comprising:

a wireless communication interface through which the access node is configured to provide air-interface service to user equipment devices (UEs);

a network communication interface through which the access node is configured to communicate on a core network; and a controller configured to cause the access node to carry out operations including: (i) monitoring a rate of voice muting on the carrier; (ii) detecting when the monitored rate of voice muting on the carrier is at least predefined threshold high; and (iii) responsive to detecting that the monitored rate of voice muting on the carrier is at least predefined threshold high, starting to apply a maximum limit on how many UEs the access node will concurrently serve with a resource-intensive service on the carrier.

15. The access node of claim 14, wherein the controller comprises at least one programmed processing unit.

16. The access node of claim 14, wherein the resource-intensive service on the carrier is selected from the group consisting of (i) using the carrier as a secondary carrier for carrier-aggregation service and (ii) transmission-time-interval bundling service on the carrier.

17. The access node of claim 14, wherein the access node normally operates in a first mode in which the access node is not set to apply the maximum limit, and wherein starting to apply the maximum limit comprises transitioning from the first mode to a second mode for a predetermined period of time in which the access node is set to apply the maximum limit until transitioning back to the first mode.

18. A computing system for controlling air-interface resource utilization and service provided by an access node, the computing system comprising:

at least one processing unit;

at least one non-transitory data storage; and program instructions stored in the at least one non-transitory data storage and executable by the at least one processing unit to carry out operations including (i) monitoring a rate of voice muting on a carrier (ii) detecting when the monitored rate of voice muting on the carrier is at least predefined threshold high; and (iii) responsive to detecting that the monitored rate of voice muting on the carrier is at least predefined threshold high, starting to apply a maximum limit on how many user equipment devices (UEs) the access node will serve with a resource-intensive service on the carrier.

19. The computing system of claim 18, wherein monitoring the rate of voice muting on the carrier comprises determining a rate of voice-packet transmission failure per unit time.

20. The computing system of claim 18, wherein the access node normally operates in a first mode in which the access node is not set to apply the maximum limit, and wherein starting to apply the maximum limit comprises the computing system causing the access node to transition from the first mode to a second mode in which the access node is set to apply the maximum limit.

* * * * *